Feb. 19, 1957 R. W. BORDEWIECK ET AL 2,781,794
ELECTRIC PROTECTION FOR LOOMS
Filed June 29, 1954 2 Sheets-Sheet 1
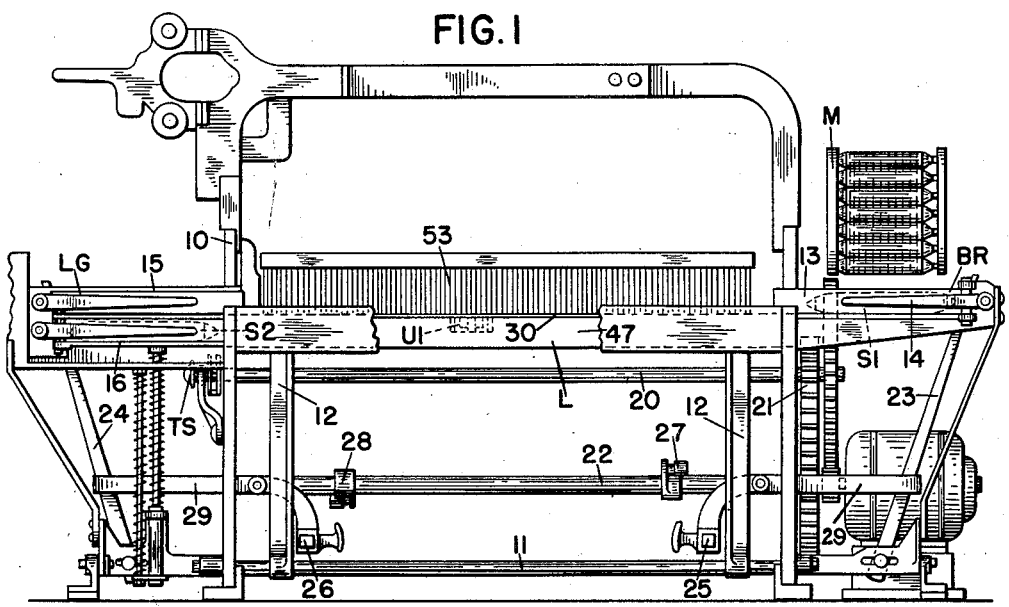
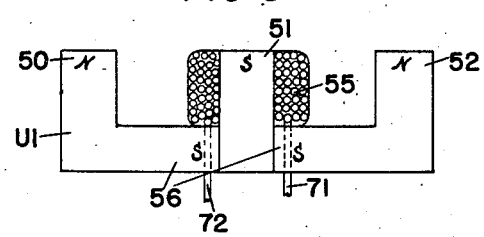
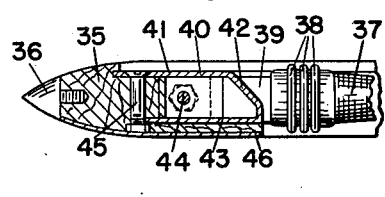
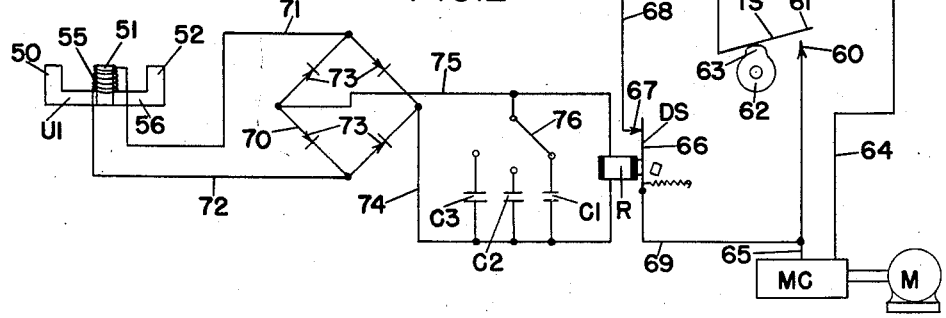
INVENTORS
ROBERT W. BORDEWIECK
VICTOR F. SEPAVICH
Charles T. Hawley
ATTORNEY

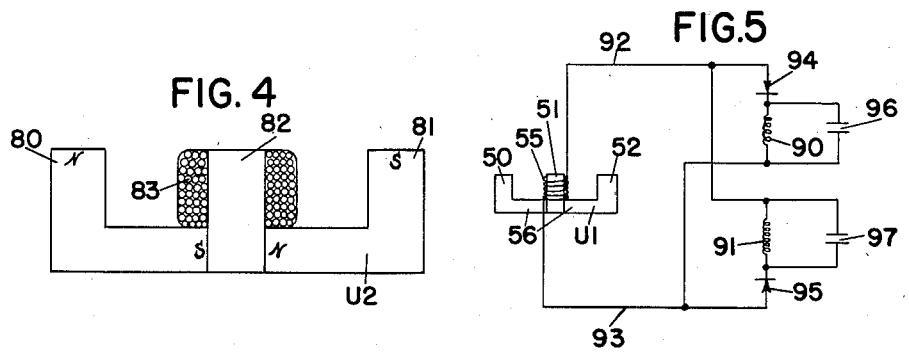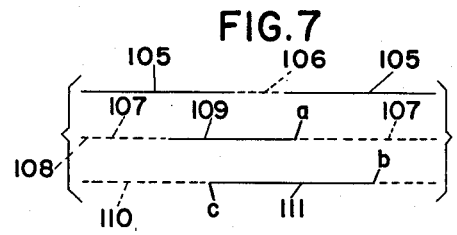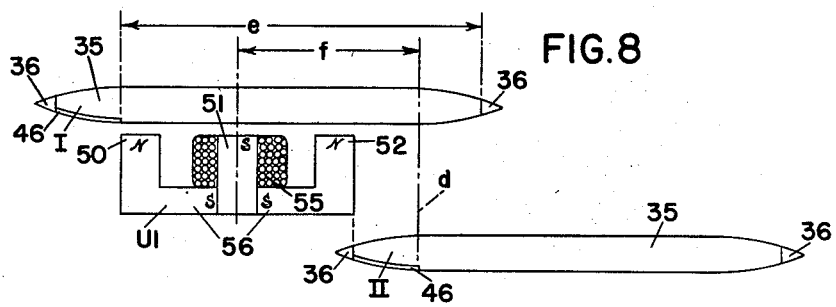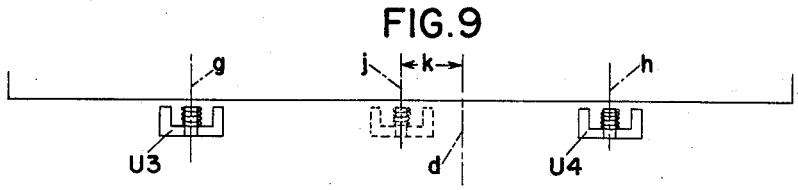

United States Patent Office 2,781,794
Patented Feb. 19, 1957

2,781,794

ELECTRIC PROTECTION FOR LOOMS

Robert W. Bordewieck, South Braintree, and Victor F. Sepavich, Worcester, Mass., assignors to Crompton & Knowles Loom Works, Worcester, Mass., a corporation of Massachusetts Application June 29, 1954, Serial No. 439,986

24 Claims. (Cl. 139—341)

This invention relates to electric protection means for looms and it is the general object of the invention to provide simplified means operated directly by electric power generated due to relative motion of the shuttle and lay to determine whether the loom shall continue to operate, or be stopped, depending upon whether the shuttle is running on time, or is late.

In Patent No. 2,586,335, issued February 19, 1952, to Howe and Sepavich there is set forth a protection for looms employing a unit mounted in the lay under the warp and including a permanent magnet and a coil in which an impulse is generated when a magnetic body carried by the shuttle passes over the unit. If the shuttle is running properly it will cause the magnetic body to pass over the unit at a given time in the loom cycle to effect ultimate energization of a relay to permit continued operation of the loom, but if the shuttle is behind schedule energization of the relay comes too late and the loom is stopped. In that patent there is shown an electronic circuit provided with a power tube the grid of which is connected to the coil on the lay and the impulse generated in the coil serves only to fire the electronic tube, a separate source of power, such as a transformer in the tube circuit, thereupon furnishes the electric power for actuating the relay.

It is an important object of the present invention to eliminate the electronic circuit and its separate source of electric power and in place thereof provide a unit capable of supplying all the electric power required for the energization of the relay.

When an electronic circuit is used as shown in the previously mentioned patent the positive wave only of an alternating current wave generated in the unit is useful to fire the tube, the negative wave being of no use. It is another object of the present invention to provide an electric protection wherein the relay is energized by both the positive and negative waves of the impulse generated in the unit. This result is accomplished as set forth hereinafter by rectification of the impulses generated in the unit. Instead of a full wave rectifier the relay may in a modified form be made with two windings each provided with a single wave rectifier and a condenser, if the latter is desired.

The unit shown in the aforesaid patent has a permanent magnet provided with two poles and the magnetic body on the shuttle passes over these poles in a very short time which however is sufficient to fire an electronic tube. When the relay is energized directly from the impulse unit, as shown herein, it is desirable that its energization extend over a period of time longer than is sufficient for firing a tube and to accomplish this result it is a further object of the invention to provide the impulse generating unit with a third pole aligned in the direction of flight of the shuttle with the other two poles of the magnet. The outer poles of the magnet may both be of the same polarity opposite to that of the intermediate pole, or the outer poles may be of opposite polarity and the intermediate pole not permanently magnetized so that it can serve as a reversible path for the magnetic flux.

In order that the invention set forth herein may be utilized on a variety of looms of different sizes and speeds, and also to be able to adjust the picking time on any given loom, it is a further object of the invention to provide adjustable condenser capacity means so that the hold-over time of energization of the relay may be made of variable length.

The electronic protection means shown in the aforesaid patent has been used more particularly on looms employing shuttles so constructed that the magnetic body could be located midway of their length. In the present instance the invention is adapted more particularly, though not necessarily, for use on weft replenishing looms the shuttles of which because of the bobbin slot through them are not well adapted to hold the magnetic body midway of their length. The magnetic body is therefore fastened to one end of the shuttle with the result that it will reach a given point along the lay at one time in the loom cycle when traveling in one direction on one pick, but will reach the point at a different time when traveling in the opposite direction on the next pick. In order to take care of this condition and cause generation of the impulses at substantially the same time in successive loom cycles, provided the shuttle is running properly, it is a further object of the invention to offset the unit from the center of the lay an amount which will enable the magnetic body on the shuttle to pass over the unit at the same time in the loom cycle whether the shuttle be running to the right or to the left. The unit is offset in the same direction in which the magnetic body is offset from the lengthwise center of the shuttle, and the amount of the offset is approximately one-half the difference between the length of the shuttle and the length of the magnetic body on it.

In order that the invention may be clearly understood reference is made to the accompanying drawings which illustrate by way of example four embodiments of the invention and in which:

Fig. 1 is a front elevation of a loom having the preferred form of the invention applied thereto, Fig. 2 shows diagrammatically an electric circuit having the preferred form of the impulse unit and preferred form of rectifier, and variable condenser means to alter the time of energization of the relay, Fig. 3 is an enlarged diagrammatic view of the preferred form of the impulse generating unit wherein the end poles are of the same polarity and the intermediate pole is of the opposite polarity, Fig. 4 shows a modified form of impulse generating unit wherein the end poles are of opposite polarity and the intermediate pole is not permanently magnetized but provides a return path for the magnetic lines of force, first to one of the end poles and then to the other, depending upon the position of the magnetic body in the shuttle, Fig. 5 is a modification showing half wave rectifiers and two windings for the relay together with a condenser for each winding.

Fig. 6 is a vertical section through the end of a shuttle of the type which may be used with the invention, Fig. 7 is a diagram showing the effect of varying the time of energization of the relay, Fig. 8 is a diagram showing the relation between the position of the unit on the lay with respect to the position of the magnetic body on the shuttle, and Fig. 9 shows a modification in which two impulse generating units are used on the lay.

Referring particularly to Fig. 1, the loom includes a frame 10 supporting a rocker shaft 11 on which are mounted layswords 12 which support the lay L. As shown in the present instance the right hand end of the lay is provided with a single shuttle box BR having a shuttle binder 13 and the usual binder spring 14, while the left hand end of the loom is shown as provided with a shuttle box gang LG comprising upper and lower boxes 15 and 16, respectively, each provided with a binder and binder spring similar to the corresponding parts of the box BR.

The loom has a top shaft 20 connected by gearing 21 to the bottom shaft 22, the gearing in the present instance being such that the top shaft makes two revolutions for each revolution of the bottom shaft, although this is not an essential feature of the invention. The loom is provided with right and left hand picker sticks 23 and 24, respectively, which are actuated from right and left hand picker shafts 25 and 26, respectively, operated by picking arms 27 and 28 on the bottom shaft, located, respectively, at the right and left for actuation of the shafts 25 and 26. The usual sweepsticks 29 are used and may be set in the ordinary manner to increase or decrease the picking force. The loom can be provided with a reserve bobbin magazine M if the invention is to be used on a weft replenishing loom.

During operation of the loom the lay L swings backwardly and forwardly in usual manner and the picker sticks 23 and 24 are actuated alternately to drive one or the other of the shuttles S1 and S2 first in one direction and then in the other. The invention is not limited in its use to the type of loom shown in Fig. 1, but when that type is used the gang of shuttle boxes LG can be shifted so that either of the two shuttle boxes 15 or 16 can be in active position to cause either shuttle S1 or shuttle S2 to be aligned with the race plate 30 of the lay. As the lay moves backwardly one of the picker sticks will be actuated on one beat of the loom and as the lay moves backwardly on the next pick of the loom the other stick will be actuated and a shuttle will be in flight through the warp shed when the lay is in the rearward part of its motion for each operation of a picker stick, either the same shuttle for successive flights or different shuttles, depending upon whether there has been a shifting of the gang LG.

Part of one of the shuttles which can be used with the present invention on a bobbin changing loom is shown in Fig. 6 wherein the wood body 35 of the shuttle may have metallic tips 36 one of which is shown in Fig. 6. The shuttle is adapted to receive a bobbin 37 having butt rings 38 which are gripped and held in position by spring steel jaws on each side thereof, one of said jaws being shown at 39. Another steel part of the shuttle comprises a guide 40 for the bobbin, this guide having a horizontal part 41 on the upper side thereof and an inclined bobbin butt guide 42 leading to a lower horizontal part 43. The steel jaws are held in position by bolt 44 and the guide 40 is held in position by screw 45. All of the metallic parts thus far described in Fig. 6 are of usual form and are customarily made of a ferrous material, such as steel. In addition, the under part of the shuttle near the left end thereof as shown in Fig. 6 has secured thereto a body 46 of magnetic material made preferably of thin strips of steel and held in any approved manner to the body of the shuttle. The magnetic body 46 is the part which is added to the shuttle for purposes of the present invention, although it has been found that the usual steel parts described can serve as a magnetic body.

Except for the body 46 the matter thus far described may be of usual construction and operation.

The lay L includes a beam 47 which may be made of wood. In the preferred form of the invention the beam 47 has embedded therein an electric impulse generating unit U1 which as shown in Fig. 3 has three magnetic poles, the outer poles in that figure being indicated as N for north and the intermediate pole halfway between the outer poles being indicated as S for south. These poles, indicated from left to right in Fig. 3 at 50, 51 and 52, are aligned lengthwise of the lay below the level of the race plate 30 and at a point intermediate the sides of the warp shed of the loom (not shown), and forward of the reed 53 under the path normally traversed by a shuttle traveling along the race plate. The center pole 51 is surrounded by a coil 55.

The north poles of unit U1 are the vertical parts of permanent magnets 56, the horizontal parts of which provide south poles which abut the lower end of the central magnet 51 of the upper end of which is a south pole. The magnets are of the permanent type, such for instance as "Alnico V" commonly known and used in the electrical industries. Any other suitable material can be used for making the permanent magnets.

The preferred form of electric circuits used with the invention is shown in Fig. 2 which sets forth diagrammatically certain parts of the invention, such for instance as a timer switch indicated at TS having a contact 60 and a blade 61 therefor under control of a cam 62 having a high point 63 which at a given time in each one pick cycle of the loom opens the switch TS. The latter is normally closed and is connected by wires 64 and 65 to a loom motor control MC. This control operates in such a manner, that is, it will permit the motor M to continue operation of the loom whenever the parts of wires 64 and 65 shown in Fig. 2 are electrically connected, but if these parts of the wires should be momentarily disconnected from each other the device MC will act to stop the looms promptly. The device MC is shown diagrammatically as an illustration of one manner of controlling the motor M, but the invention is not liimted to any particular kind of control for the motor.

The loom is provided with a relay R controlling detector switch DS having an armature switch blade 66 which is normally held away from contact 67. Whenever the relay is energized the blade 66 is attracted by the relay to engage contact 67 and wires 68 and 69 will be momentarily electrically connected to the wires 64 and 65, respectively. In the normal operation of the loom the relay will act to close its switch at least during the period that switch TS is open so that wires 64 and 65 are connected through either the timer switch or the detector switch.

The preferred form of the invention utilizes a full wave rectifier 70 the top and bottom of which as shown in Fig. 2 are connected by wires 71 and 72 to opposite sides of the coil 55. The full wave rectifier 70 has four rectifiers 73 connected as shown in Fig. 2. The right and left sides of the full wave rectifier are connected by wires 74 and 75, respectively, to the relay.

Connected across the wires 74 and 75 and in parallel with the relay is a preferred means for varying or prolonging energization of the relay comprising a condenser arrangement which in the form shown utilizes three condensers C1, C2 and C3 of different capacities. One side of each of these condensers is connected to wire 74, and a switch 76 connected to wire 75 is connectable to the other sides of the condensers, one at a time.

In the operation of the matter thus far described the shuttle will be picked back and forth along the lay and the magnetic body 46 will pass over the unit U1 and will generate positive and negative electric impulses in the unit. By reason of the full wave rectifier 70 these waves are converted into a unidirectional current to pass through the relay R and also charge whichever one of the condensers is connected in parallel with the relay by the switch 76. The length of the magnetic body 46 is approximately equal to the distance between adjacent poles of the unit U1, that is, for instance equal to the distance between poles 50 and 51 and between poles 51 and 52.

During the time the magnetic body 46 is passing over the unit U1 the relay R, which is a form of electromagnetic device to control the detector switch DS, will be maintained energized by the impulses developed in the coil 55 and also by electric power fed back from the condenser connected thereto. The length of the unit U along the lay is sufficient so that the electric power derived from the coil 55 as the magnetic body 46 passes over it will keep the relay R energized at least sufficiently long to maintain the detector switch closed while the timer switch is open, provided the shuttle is running on time. The coil 55 supplies all of the electric energy which operates the relay and charges the condenser connected to the relay, and no additional source is necessary as is the case in the previously mentioned patent.

The modified form of unit U2 shown in Fig. 4 has outer permanent magnets of opposite polarity, these being shown at 80 and 81 as north and south poles, respectively. The intermediate pole is not a permanent magnet but is highly permeable to magnetic lines of force. As is the case in unit U1, the intermediate pole 82 is half way between the poles 80 and 81 and the poles of the unit U2 are aligned lengthwise of the lay and are otherwise located as are the poles of unit U1. When the magnetic body 46 passes over the unit U2 there will be induced in coil 83, which surrounds pole 82 and is similar to coil 55, alternating electric waves which will be converted to unidirectional current by the rectifier 70. During the passage of the magnetic body 46 over the unit U2 magnetic lines of force will flow in one direction, as down for instance, when the body has moved part way across the unit U2, and then the magnetic lines reverse and move up through pole 82 when the body 46 completes the latter part of its motion over the unit U2. The coil 83 will be connected in the circuit shown in Fig. 2 in place of coil 55 when the modified form of unit is used and the circuits shown in Fig. 2 can be the same for the modified form of the unit U2.

It will be understood that the magnetic body 46 is at one end of the shuttle and is not located centrally with respect to the length of the shuttle so that when traveling in one direction, for instance, to the right, Fig. 1, it will pass a given point on the lay later in the shuttle travel and cycle of the loom than will be the case when the shuttle is traveling to the left. If the units U1 or U2 were located exactly in the center of the lay the impulses would then be developed at slightly different times on successive travels of the shuttles in opposite directions.

In order that the impulses may be developed at the same time in all normal flights of the shuttle the units U1 or U2 will be located somewhat to the left of the longitudinal center of the lay, or the distances between the shuttle boxes BR and LG, by an amount equal approximately to one half of that part of the length of the shuttle from the right hand end of body 46, Fig. 6, to the opposite or right hand end of the shuttle. This relation is shown in Fig. 8 where line $d$ represents the longitudinal center of the lay and the length of the shuttle less the length of body 46 is represented by line $e$. The line $f$ is approximately one half line $e$ and represents the amount of offset of the center pole 51 to the left of line $d$. If the shuttle is running at equal speeds both right and left it will at the same instant of its flight for two flights in opposite directions be at equal distances from line $d$. When a shuttle is moving to the right it will reach position I, Fig. 8, with the right hand end of body 46 in register with the left end of the unit, and when moving to the left the left end of body 46 will reach a position II, Fig. 8, in register with the right hand end of the unit. In these two positions a change will begin in the magnetic field in coil 55 and this change will occur at the instants mentioned, since the shuttle positions I and II are symmetrically placed relative to line $d$. The offset of the unit is in the same direction as the offset of body 46 relative to the lengthwise center of the shuttle.

Another modification wherein the relay is provided with two windings 90 and 91 is shown diagrammatically in Fig. 5. In this modification the unit on the lay, which may be either the preferred or modified form, will supply positive and negative impulses to the wires 92 and 93. As assumed in Fig. 5, when wire 92 is positive current will flow down through rectifier 94 and through coil 90 to wire 93. When wire 93 is positive current will flow upwardly through rectifier 95 and through coil 91 to wire 92. The coils 90 and 91 have connected across them condensers 96 and 97, respectively, which are charged when current is flowing through the associated coil. The coils 90 and 91 are so connected that when current flows through them as permitted by their rectifiers they will maintain the same polarity at the relay.

One reason for providing a variation in the time of energization of the relay R by the condensers C1—C3 is to permit some adjustment of the time of picking of the shuttle in the loom cycle. In Fig. 7 there is shown diagrammatically the time relation between the opening of the timing switch TS and closure of the detector switch DS. The solid parts of line 105 in Fig. 7 indicate closure of the switch TS whereas the interval represented by the dotted lines 106 represent the time of opening of switch TS. The dotted line parts 107 of line 108 represents the time during which the detector switch DS is open while the solid part 109 of line 108 represents the time during which the detector switch is closed. For continued running of the loom one or the other of these switches must be closed, but the period during which the detector switch is closed can be made longer than the period during which the timer switch is open depending upon which of the condensers C1—C3 is in circuit with the relay. If for instance the time of opening of switch TS and closing switch DS is as shown by lines 105 and 108 in Fig. 7 for any one setting of the picking of the loom and the power of picking is increased to make the shuttle travel faster, the effect will be to move the solid part 109 in line 108 to the right and if the left hand part of the solid part 109 should align with the dotted line 106, that is, if the time of closure of the relay switch should not begin until after the timer switch is open, the loom would be stopped unnecessarily. In order to take care of this adjustment in picking the time of energization of the relay can be increased so that, referring to line 110 of Fig. 7, the solid part 111 thereof will be longer than solid part 109 on line 108 so that switch DS will remain closed during opening of switch TS. In this diagram the right end $a$ of solid line 109 corresponds in time in the loom cycle to the right end $b$ of line 111, and the left end $c$ of line 111 is to the left of any part of the dotted line 106.

Thus far only one electric impulse generating unit on the lay has been described, but in wide looms it may be desirable to employ two coils, the coils, however, being spaced different distances from the longitudinal center of the lay. Thus, as shown diagrammatically in Fig. 9, two units U3 and U4 similar to either of the units U1 or U2 can be utilized and are preferably located at unequal distances from the lengthwise center of the lay so as to take advantage of the general relations described in connection with Fig. 8. Wide looms may operate with shuttles longer than the shuttle shown in Fig. 8, but the principle described in connection with that figure will be retained in the wider looms. In Fig. 9 the lines $g$ and $h$ correspond to the center lines of units U3 and U4, respectively, and these lines are at equal distances from line $j$ spaced from the longitudinal center line $d$ of the lay by the distance $k$ equal to one half the difference in lengths of the shuttle and the magnetic body 46.

From the foregoing it will be seen that we have provided simple means by which the coil on the impulse generating unit supplies all of the electric power required for energization of the electromagnetic device or relay R. The connections between the coil and the relay include rectifier means so that the alternating current impulses from the coil can be converted into unidirectional impulses, whether one or two windings of the relay are employed. Also, the unit arranged along the path of the shuttle is twice as long as the body of magnetic material on the shuttle, thereby insuring impulses over a sufficiently long period to cause energization of the relay. The magnetic body on the shuttle and the unit on the lay comprise two means which cooperate due to relative motion thereof to produce the impulses. The magnetic field produced at the unit and through which the magnetic body passes has been shown herein as being supplied by two forms of units but the invention is not necessarily limited to these forms. Furthermore, in order that the invention may be adapted for use on weft replenishing looms the magnetic body is located at one end of the shuttle and in order that the impulse may be generated at the same time in two loom beats when the shuttle is traveling in opposite directions the unit is offset from the longitudinal center of the path of the shuttle by an amount equal to the length of the shuttle minus the length of the magnetic body divided by two. Another way of stating this same relation is that when the longitudinal center of the shuttle coincides with the longitudinal center of the shuttle path the center of the unit will register with the mid point of the magnetic body measured in the direction of the shuttle path. In wide looms in which it may be desired to have two units the same principle of offset of the units would be employed as that described for those looms in which only one unit is employed. The condensers C1—C3 provide variable adjustable condenser means by which the detector switch DS can be maintained closed for a sufficiently long interval of time and during at least for the period of opening of the timer switch TS so that if the rate of shuttle motion should be increased by adjustment of the picking mechanism the discharge of the condenser through the relay can be prolonged. It will also be seen that the invention sets forth an improved lay and shuttle for a loom such as that described wherein the offset of the unit from the longitudinal center of the lay bears the relation to the length of the shuttle and magnetic body thereon as already stated.

Having now particularly described and ascertained the nature of the invention and in what manner the same is to be performed, what is claimed is:

1. In electric protection means for a loom dependent for continued operation thereof on energization of an electromagnetic device at a given time in each beat of the loom, a shuttle moving in a path across the loom incident to operation of the latter and having a magnetic body thereon, an electric impulse generating unit which the shuttle passes in its flight across the loom comprising means to create a magnetic field and a coil electromagnetically associated with said field, said magnetic body on the shuttle in the flight thereof cooperating with said field to induce in said coil all the electric power required to energize said device, and electric connections between said coil and said device by which said electric current when generated in said coil can energize said device.

2. The protection means set forth in claim 1 wherein the generating unit generates alternating current and said connections include wires connected to opposite sides of said coil and a rectifier means connected across said wires converts the alternating current generated in the coil to unidirectional current for energization of said device.

3. The protection means set forth in claim 1 wherein said unit has two spaced permanent magnetic poles of the same polarity and a third permanent magnetic pole intermediate said two poles but of the opposite polarity.

4. The protection means set forth in claim 1 wherein said unit comprises two spaced permanent magnets of opposite polarity and a third pole intermediate said two poles is not normally magnetized but is capable of transmitting magnetic flux in opposite directions.

5. The protection means set forth in claim 1 wherein the unit includes three magnetic poles aligned substantially parallel to said path, the central pole being equally spaced from the outer poles and the length of the magnetic body on the shuttle being equal substantially to the distance between the intermediate pole and either of the outer poles.

6. The protection means set forth in claim 1 wherein the unit has three magnetic poles aligned parallel to said path and the coil surrounds the center pole.

7. The protection means set forth in claim 1 wherein said electromagnetic device has two windings and the coil generates positive and negative electric waves and a half wave rectifier is included in said electrical connections for each winding, said rectifiers causing a positive impulse derived from said coil to energize one of said windings and a negative impulse derived from said coil to energize the other winding, said windings being so connected in said connections that the magnetic flux induced in said device by said windings flows in the same direction to maintain the same polarity of said device for both the positive and negative waves.

8. In electric protection means for a loom having a warp shed and a shuttle which moves along a path passing through the shed, the loom having means to stop its operation upon failure of an electromagnetic device to be energized at a given time in the loom cycle of operation, two means effective due to relative motion thereof to generate electric impulses constituting the sole source of electric power to energize said device, one of said means being a magnetic body carried by the shuttle and the other means being a unit located adjacent to the path of the shuttle and comprising a coil electrically connected to the device and means creating a magnetic field the strength of which is varied due to passage of the magnetic body through the field, variation in the strength of the magnetic field causing said impulses in the coil.

9. The protection means set forth in claim 8 wherein passage of the shuttle generates in said coil electric waves of opposite polarity and rectifier means to convert said waves into unidirectional current and deliver the unidirectional current to said device.

10. The protection means set forth in claim 8 wherein the second of said two means comprises three poles aligned in the direction of said path of the shuttle, one of said poles being between and equally spaced from the other two poles and the magnetic means on the shuttle being of a length equal to the distance between adjacent poles so that the time during which said electric current is generated is equal to the time required for the shuttle to travel along its path a distance equal to substantially twice the length of said magnetic body.

11. In electric protection means for a loom having a warp shed and a shuttle which moves along a path passing through the shed, the loom having means to stop its operation upon failure of an electromagnetic device to be energized at a given time in the loom cycle of operation, an electric impulse generating unit located outside the shed adjacent to said path intermediate the sides of said shed comprising three poles aligned lengthwise with respect to said path, an electric coil surrounding an intermediate pole of said unit, and means on the shuttle effective when passing said unit to cooperate with the latter to generate in said coil an impulse sufficiently strong to energize said electromagnetic device, and electric connections between said coil and said device.

12. In electric protection means for a loom having provision for adjusting the rate of movement of the shuttle and dependent for continued operation thereof upon energization of an electromagnetic device during a given time in each beat of the loom and wherein the shuttle, due to varying rates of motion thereof, may arrive at different points along the travel thereof at said given time, a magnetic body on the shuttle, an electric impulse generating unit which the shuttle passes in its flight comprising means to create a magnetic field and a coil electromagnetically associated with said field, said magnetic body due to flight of the shuttle cooperating with said field to induce in said coil an electric current of sufficient strength to energize said device, an adjustable electric condenser means capable when charged and by reason of the adjustment thereof of discharging through said device to maintain the latter energized during times of different length, depending upon the adjustment thereof, and electric connections between the coil and said device by which said electric current when generated in said coil energizes said device and charges said condenser means.

13. In electric protection means for a loom having provision for adjusting the rate of movement of the shuttle and dependent for continued operation thereof upon energization of an electromagnetic device during a given time in each beat of the loom and wherein the shuttle, due to varying rates of motion thereof, may arrive at different points along the travel thereof at said given time, a magnetic body on the shuttle, an electric impulse generating unit which the shuttle passes in its flight comprising means to create a magnetic field and a coil electromagnetically associated with said field, said magnetic body due to flight of the shuttle cooperating with said field to induce in said coil an electric current of sufficient strength to energize said device, a plurality of electric condensers of different capacities connectable one at a time in parallel with said device, and electric connections between said coil and said device and condensers by which said electric current when generated in said coil energizes said device and charges the condenser in parallel therewith, each of said condensers when in parallel with the device discharging through the latter for a period of time different from the period of discharge of the other condensers.

14. The electric protection means set forth in claim 12 wherein a condenser of relatively small capacitance can be connected in parallel with the device when the shuttle is traveling at a relatively high rate, and wherein another of the condensers having a larger capacitance can be connected in parallel with the device when the shuttle is traveling at a lower rate.

15. In electric protection means for a loom having a switch which opens for a given period at a given time in each beat of the loom and wherein continued running of the loom depends upon energization of an electromagnetic device throughout said period, the loom having a provision for picking the shuttle at different rates of speed so that the shuttle when traveling at a relatively high speed will reach a point in the travel thereof at the beginning of said period beyond another point which it reaches when traveling at lower speed, an electric generating unit located along the path of the shuttle, a magnetic body on the shuttle effective when passing said unit to generate therein an electric current of sufficient strength to energize said device, and adjustable condenser means capable due to the adjustment thereof of discharging through said device for different intervals of time and adjustable to discharge through said device for a relatively long interval when the shuttle travels at a relatively high rate of speed to maintain said devices energized until the end of said period, provided the shuttle is running on time, and adjustable to discharge through the device for a shorter interval when the shuttle is traveling at a relatively slow rate of speed.

16. In electric protection means for a loom dependent for continued operation thereof upon energization of an electromagnetic device at a given time in each of two successive beats of the loom during which the shuttle travels in opposite directions, a magnetic body carried by the shuttle at one end thereof, an electric impulse generating unit which the shuttle passes in its flight across the loom comprising means to create a magnetic field and a coil in which electric impulses are generated when the magnetic body passes through the magnetic field due to motion of the shuttle, and electric connections between said coil and said device whereby the latter is energized by the impulses generated in said unit, the center of said magnetic field being offset from the longitudinal center of the path of the shuttle in the same direction as said body is offset from the longitudinal center of the shuttle and by an amount equal to the length of the shuttle minus the length of the magnetic body divided by two.

17. In electric protection means for a loom dependent for continued operation upon energization of an electromagnetic device at a given time in each of successive beats of the loom in which the shuttle travels first in one direction and then in the opposite direction along the path thereof, cooperating means including a magnetic body at one end of the shuttle and an electric impulse generating unit arranged along the path of the shuttle effective when the body passes the unit to generate electric impulses in said unit of sufficient strength to energize said device, and electric means connecting said unit with said device to energize the latter by said impulses, the center of the unit measured lengthwise of said path and the body being offset in the same direction from the longitudinal center of the path and of the shuttle, respectively, the amount of offset of the center of the unit from the longitudinal center of the path being equal to the length of the shuttle minus the length of the body divided by two.

18. In electric protection means for a loom dependent for continued operation upon energization of an electromagnetic device at a given time in each of successive beats of the loom in which the shuttle travels first in one direction and then in the opposite direction along the path thereof, cooperating means including a magnetic body at one end of the shuttle and an electric impulse generating unit arranged along the path of the shuttle effective when the body passes the unit to generate electric impulses in said unit of sufficient strength to energize said device, and electric means connecting said unit with said device to energize the latter by said impulses, the unit being offset from the longitudinal center of said path in a given direction and the body being offset in the same direction from the longitudinal center of the shuttle, the location of the unit and the body and the length of the shuttle being such that when the longitudinal center of the shuttle registers with the longitudinal center of said path the center of the unit measured lengthwise of said path will register with a point on said body midway of the length thereof measured lengthwise of the shuttle.

19. In electric protection means for a loom dependent for continued operation upon energization of an electric magnetic device at the same given time in each of two successive beats of the loom, a shuttle traveling along a path in one direction on one of said beats and along said path in the opposite direction on the second of said beats, a magnetic body on one end of the shuttle, and two electric impulse generating units located at different points along the path of the shuttle, the body when passing over either unit generating therein electric impulses of sufficient strength to energize said device, electric connections between said units and said device whereby said units when generating said impulse are effective to energize said device, the centers of said units measured lengthwise of said path being equi-distant from a point along said path which is spaced from the longitudinal center of said path by a distance equal to the length of the shuttle minus the length of the body divided by two, said point being offset from the longitudinal center of said path in the same direction as said body is offset from the longitudinal center of the shuttle.

20. In a loom lay and a shuttle for a loom having stopping means controlled by an electric impulse and wherein the shuttle travels first in one direction and then in the opposite direction along the lay, an electric impulse generating unit on the lay including magnetic means to create a magnetic field the poles of which are aligned lengthwise of the lay and a coil in the magnetic field, and a magnetizable body on one end of the shuttle to pass through said magnetic field when the shuttle is traveling in either of said directions along the lay and effective when passing through said field to cooperate with said field to generate said impulse in said coil, the magnetic body being offset in a given direction from the lengthwise center of the shuttle and the center of the magnetic means measured lengthwise of the lay being offset in the same direction from the lengthwise center of the lay and spaced from the latter center by an amount equal substantially to the length of the shuttle less the length of the magnetic body divided by two.

21. The lay and shuttle set forth in claim 20 wherein the unit on the lay comprises three poles aligned lengthwise of the lay, one of said poles being between and equidistant from the other two poles and being surrounded by said coil.

22. The lay and shuttle set forth in claim 21 wherein each of said two poles is a permanent magnet.

23. The lay and shuttle set forth in claim 21 wherein the length of said magnetic body is equal substantially to the distance between two adjacent poles of the unit.

24. The lay and shuttle set forth in claim 22 wherein each of said two poles is the vertical part of a permanent magnet having a horizontal part and said one pole is on the upper part of a magnetic mass the lower part of which abuts the horizontal parts of said two permanent magnets.

References Cited in the file of this patent
UNITED STATES PATENTS

| | | |
|---|---|---|
| 2,556,785 | Abbott | June 12, 1951 |
| 2,567,751 | Wolke | Sept. 11, 1951 |
| 2,586,335 | Howe | Feb. 19, 1952 |